US010178408B2

(12) United States Patent
Chono

(10) Patent No.: US 10,178,408 B2
(45) Date of Patent: Jan. 8, 2019

(54) VIDEO CODING DEVICE, VIDEO DECODING DEVICE, VIDEO CODING METHOD, VIDEO DECODING METHOD, AND PROGRAM

(71) Applicant: NEC Corporation, Tokyo (JP)

(72) Inventor: Keiichi Chono, Tokyo (JP)

(73) Assignee: NEC Corporation, Tokyo (JP)

( * ) Notice: Subject to any disclaimer, the term of this patent is extended or adjusted under 35 U.S.C. 154(b) by 242 days.

(21) Appl. No.: 14/905,642

(22) PCT Filed: Jun. 3, 2014

(86) PCT No.: PCT/JP2014/002958
§ 371 (c)(1),
(2) Date: Jan. 15, 2016

(87) PCT Pub. No.: WO2015/008417
PCT Pub. Date: Jan. 22, 2015

(65) Prior Publication Data
US 2016/0142732 A1    May 19, 2016

(30) Foreign Application Priority Data

Jul. 19, 2013  (JP) ................ 2013-150243

(51) Int. Cl.
*H04N 19/593* (2014.01)
*H04N 19/136* (2014.01)
(Continued)

(52) U.S. Cl.
CPC .......... *H04N 19/593* (2014.11); *H04N 19/11* (2014.11); *H04N 19/136* (2014.11);
(Continued)

(58) Field of Classification Search
CPC .... H04N 19/593; H04N 19/11; H04N 19/136; H04N 19/159; H04N 19/176; H04N 19/186; H04N 19/44; H04N 19/70
(Continued)

(56) References Cited

U.S. PATENT DOCUMENTS

2008/0123947 A1    5/2008 Moriya et al.
2008/0170615 A1    7/2008 Sekiguchi et al.
(Continued)

FOREIGN PATENT DOCUMENTS

JP    2008-172599    7/2008
JP    2013-77899     4/2013
(Continued)

OTHER PUBLICATIONS

Chen et al. CE6.A.4 Chroma intra prediction by reconstructed luma samples, Mar. 16-23, 2011, Joint Collaborative Team on Video Coding (JVCT-VC), Document JCTVC-E266, pp. 1-10.*
(Continued)

*Primary Examiner* — Marnie A Matt
(74) *Attorney, Agent, or Firm* — Finnegan, Henderson, Farabow, Garrett & Dunner, L.L.P.

(57) ABSTRACT

In a video coding device, an intra prediction unit 11 generates a predicted block, based on an adjacent reconstructed image. A intra first chroma prediction mode coding unit 12 codes an intra prediction mode of a first chroma component based on an intra prediction mode of a luma component. A intra second chroma prediction mode coding unit 13 codes an intra prediction mode of a second chroma component depending on the intra prediction mode of the first chroma component.

12 Claims, 13 Drawing Sheets

(51) Int. Cl.
*H04N 19/44* (2014.01)
*H04N 19/186* (2014.01)
*H04N 19/11* (2014.01)
*H04N 19/176* (2014.01)
*H04N 19/159* (2014.01)
*H04N 19/70* (2014.01)

(52) U.S. Cl.
CPC ......... *H04N 19/159* (2014.11); *H04N 19/176* (2014.11); *H04N 19/186* (2014.11); *H04N 19/44* (2014.11); *H04N 19/70* (2014.11)

(58) Field of Classification Search
USPC ...................................... 375/240.08
See application file for complete search history.

(56) References Cited

U.S. PATENT DOCUMENTS

| | | | |
|---|---|---|---|
| 2009/0034856 A1* | 2/2009 | Moriya | G06T 9/004 |
| | | | 382/238 |
| 2011/0255591 A1* | 10/2011 | Kim | H04N 19/107 |
| | | | 375/240.02 |
| 2012/0177112 A1 | 7/2012 | Guo et al. | |
| 2012/0287995 A1* | 11/2012 | Budagavi | H04N 19/11 |
| | | | 375/240.12 |
| 2013/0272401 A1* | 10/2013 | Seregin | H04N 19/00533 |
| | | | 375/240.12 |
| 2015/0036745 A1* | 2/2015 | Hsu | H04N 19/593 |
| | | | 375/240.12 |
| 2015/0365684 A1* | 12/2015 | Chen | H04N 19/593 |
| | | | 375/240.13 |

FOREIGN PATENT DOCUMENTS

| | | |
|---|---|---|
| WO | WO 2007/010690 A1 | 1/2007 |
| WO | WO 2012/087077 A2 | 6/2012 |
| WO | WO 2012/092761 A1 | 7/2012 |

OTHER PUBLICATIONS

J. Min et al., "AHG5: Chroma intra prediction in extended chroma formats", Joint Collaborative Team on Video Coding (JCT-VC) of ITU-T SG16 WP 3 and ISO/IEC JTC 1/S 29/WG11 13$^{th}$ Meeting, JCTVC-M0107, pp. 1-7, Apr. 2013.

J. Chen et al., "CE6.a.4: Chroma intra prediction by reconstructed luma samples", Joint Collaborative Team on Video Coding (JCT-VC) of ITU-T SG16 WP3 and ISO/IEC JTC1/SC29/WG11 5$^{th}$ Meeting, JCTVC-E266, pp. 1-10, Mar. 2011.

B. Bross et al., "High efficiency video coding (HEVC) text specification draft 7", Joint Collaborative Team on Video Coding (JCT-VC) of ITU-T SG16 WP3 and ISO/IEC JTC1/SC29/WG11 9$^{th}$ Meeting, JCTVC-11003_d9, pp. i-258, Apr.-May 2012.

International Search Report and Written Opinion of ISA dated Sep. 2, 2014 in corresponding PCT International Application.

\* cited by examiner

| INTRA SECOND CHROMA PREDICTION MODE SYNTAX | | INTRA FIRST CHROMA PREDICTION MODE SYNTAX | | | | |
|---|---|---|---|---|---|---|
| NUMBER | VARIABLE-LENGTH CODE | 0 | 26 | 10 | 1 | x ( 0 ≤ x < 35 ) |
| 0 | 100 | 34 | 0 | 0 | 0 | 0 |
| 1 | 101 | 26 | 34 | 26 | 26 | 26 |
| 2 | 110 | 10 | 10 | 34 | 10 | 10 |
| 3 | 111 | 1 | 1 | 1 | 34 | 1 |
| 4 | 0 | 0 | 26 | 10 | 1 | x |

- INTRA CHROMA PREDICTION MODE FOR U COMPONENT AND INTRA CHROMA PREDICTION MODE FOR V COMPONENT ARE IDENTICAL
- INTRA CHROMA PREDICTION MODE FOR U COMPONENT AND INTRA CHROMA PREDICTION MODE FOR V COMPONENT ARE NOT IDENTICAL

FIG. 5

(SYNTAX TABLE)

Sequence parameter set RBSP syntax

| seq_parameter_set_rbsp(){ | Descriptor |
|---|---|
| profile_space | u(3) |
| profile_idc | u(5) |
| constraint_flags | u(16) |
| level_idc | u(8) |
| for( i=0; < 32, i++ ) | |
|     profile_compatability_flag[i] | u(1) |
| seq_parameter_set_id | ue(v) |
| video_parameter_set_id | ue(v) |
| chroma_format_idc | ue(v) |
| if( chroma_format_idc == 3 ) | |
|     separate_colour_plane_flag | u(1) |
| ... | |
| vui_parameters_present_frag | u(1) |
| if( vui_parameters_present_frag ) | |
|     vui_parameters() | |
| sps_extension_frag | u(1) |
| if( sps_extension_frag ) | |
|     while(more_rbsp_data()) | |
|         sps_extension_data_frag | u(1) |
| if( profile_idc==XXXX ) | |
|     intra_second_chroma_pred_mode_enable_flag | u(1) |
| rbsp_trailing_bits() | |
| } | |

FIG. 6

Coding unit syntax

| coding_unit( x0, y0, log2CbSize ) { | Descriptor |
|---|---|
|   CurrCbAddrTS = MinCbAddrZS[ x0 >> Log2MinCbSize ][ y0 >> Log2MinCbSize ] | |
|   if( transquant_bypass_enable_flag ) { | |
|     cu_transquant_bypass_flag | ae(v) |
|   } | |
|   if( slice_type != I ) | |
|     skip_flag[ x0 ][ y0 ] | ae(v) |
|   if( skip_flag[ x0 ][ y0 ] ) | |
|     prediction_unit( x0, y0, log2CbSize ) | |
|   else { | |
|     if( slice_type != I ) | |
|       pred_mode_flag | ae(v) |
|     if( PredMode != MODE_INTRA \|\| log2CbSize == Log2MinCbSize ) | |
|       part_mode | ae(v) |
|     x1 = x0 + ( (1 << log2CbSize) >> 1 ) | |
|     y1 = y0 + ( (1 << log2CbSize) >> 1 ) | |
|     ... | |
|     if( PredMode == MODE_INTRA ) { | |
|       if( PartMode == PART_2Nx2N && pcm_enabled_flag && <br>        log2CbSize >= Log2MinIPCMCUSize && <br>        log2CbSize <= Log2MaxIPCMCUSize ) | |
|       pcm_flag | ae(v) |
|       if( pcm_flag ) { | |
|         ... | |
|       } else { | |
|         pbOffset = ( PartMode == PART_MxN ) ? ( (1<<log2CbSize) >> 2 ) : 0 | |
|         for( j = 0; j <= pbOffset; j = j + pbOffset ) | |
|           for( i = 0; i <= pbOffset; i = i + pbOffset ) { | |
|             prev_ntra_lluma_pred_flag[ x0+i ][ y0+j ] | ae(v) |
|           } | |
|         for( j = 0; j <= pbOffset; j = j + pbOffset ) | |
|           for( i = 0; i <= pbOffset; i = i + pbOffset ) { | |
|             if( prev_intra_luma_pred_flag[ x0+i ][ y0+j ] ) | |
|               mpm_idx[ x0+i ][ y0+j ] | ae(v) |
|             else | |
|               rem_iintra_luma_pred_mode[ x0+i ][ y0 +j ] | ae(v) |
|           } | |
|         intra_chroma_pred_mode[ x0 ][ y0 ] | ae(v) |
|         if( intra_second_chroma_pred_mode_enable_flag ) { | |
|           intra_second_chroma_pred_mode[ x0 ][ y0 ] | |
|         } | |
|       } | |
|     } else { | |
|       ... | |
|     } | |

FIG. 7

| | |
|---|---|
| if( !pcm_flag ) { | |
| ... | |
| } | |
| } | |
| } | |

[SYNTAX DEFINITION]

intra_second_chroma_pred_mode_enable_flag specifies the presence of
intra_second_chroma_pred_mode syntax in the coded bitstream.

intra_second_chroma_pred_mode[ x0 ][ y0 ] specifies the intra prediction mode for chroma samples of
the second chroma component. The array indices x0, y0 specify the location ( x0, y0 ) of the top-left luma
sample of the considered prediction block relative to the top-left luma sample of the picture.
When If any of the following conditions are true, intra_second_chroma_pred_mode is not present and the value
is inferred to be equal to 4 + chroma_pred_from_luma_enabled_flag (i.e., both intra prediction modes for
the first and second chroma components are identical.).
- intra_second_chroma_pred_mode_enable_flag is equal to 0.
- intra_second_chroma_pred_mode_enable_flag is equal to 1, chroma_pred_from_luma_enabled_flag
  is equal to 1, and the corresponding intra_chroma_pred_mode is equal to 4.

FIG. 8

| INTRA SECOND CHROMA PREDICTION MODE SYNTAX | | INTRA FIRST CHROMA PREDICTION MODE SYNTAX | | | | |
|---|---|---|---|---|---|---|
| NUMBER | VARIABLE-LENGTH CODE | 0 | 26 | 10 | 1 | x ( 0 ≤ x ≤ 35 ) |
| 0 | 100 | 35 | 0 | 0 | 0 | 0 |
| 1 | 101 | 26 | 35 | 26 | 26 | 26 |
| 2 | 110 | 10 | 10 | 35 | 10 | 10 |
| 3 | 111 | 1 | 1 | 1 | 35 | 1 |
| 4 | 0 | 0 | 26 | 10 | 1 | x |

INTRA CHROMA PREDICTION MODE
FOR U COMPONENT AND INTRA CHROMA
PREDICTION MODE FOR V COMPONENT ARE IDENTICAL

LINEAR PREDICTION MODE

INTRA CHROMA PREDICTION MODE
FOR U COMPONENT AND INTRA CHROMA
PREDICTION MODE FOR V COMPONENT ARE NOT IDENTICAL

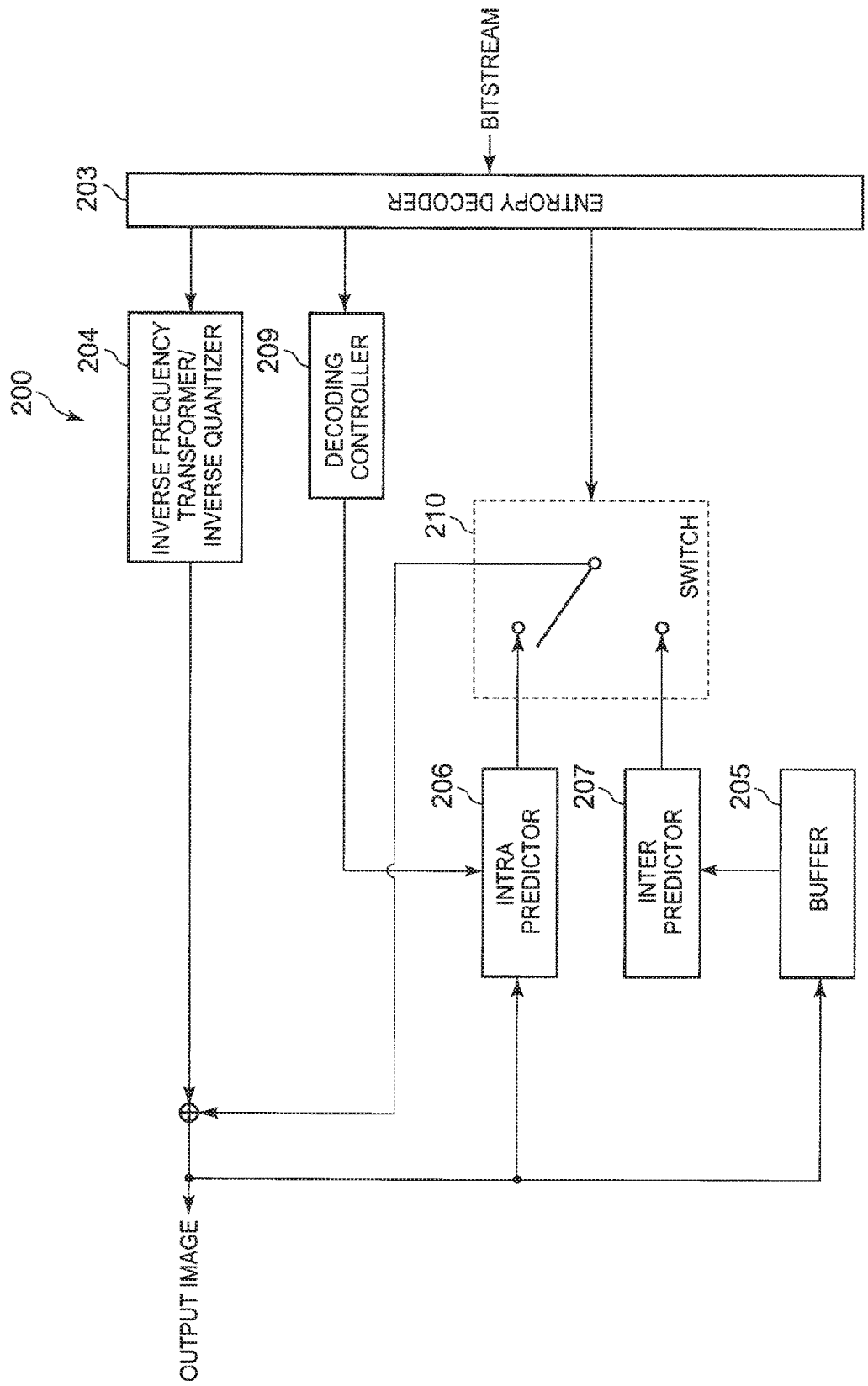

VIDEO CODING DEVICE, VIDEO DECODING DEVICE, VIDEO CODING METHOD, VIDEO DECODING METHOD, AND PROGRAM

CROSS-REFERENCE TO RELATED PATENT APPLICATIONS

This application is a National Stage Entry of International Application No. PCT/JP2014/002958, filed Jun. 3, 2014, which claims priority from Japanese Patent Application No. 2013-150243, filed Jul. 19, 2013. The entire contents of the above-referenced applications are expressly incorporated herein by reference.

TECHNICAL FIELD

The present invention relates to a high-efficiency intra-frame prediction technique for chroma signals.

BACKGROUND ART

In the video coding scheme based on the method described in Non Patent Literature (NPL) 1, each frame of digitized video is split into coding tree units (CTUs), and each CTU is coded in raster scan order. Each CTU is split into coding units (CUs) and coded, in a quadtree structure. Each CU is split into prediction units (PUs) and predicted. The prediction error of each CU is split into transform units (TUs) in a quadtree structure and frequency-transformed.

A CU is a unit of coding in intra prediction/inter-frame prediction. Intra prediction and inter-frame prediction are described below.

Intra prediction (intra-frame prediction) is a prediction that generates a prediction signal from a reconstructed image of a frame to be coded. NPL 1 defines, for example, 33 types of angular intra prediction depicted in FIG. 14. In angular intra prediction, a reconstructed pixel around a block to be encoded is extrapolated in any of 33 directions depicted in FIG. 14, to generate an intra prediction signal.

In addition to angular intra prediction, DC prediction and planar prediction are specified as intra prediction. In DC prediction, a mean value of a reference image is used as the prediction values of all pixels in a TU to be predicted. In planar prediction, a prediction image is generated by linear interpolation from pixels in a reference image.

Inter-frame prediction is a prediction based on an image of a reconstructed frame (reference picture) different in display time from a frame to be coded. Inter-frame prediction is also referred to as inter prediction. In inter prediction, an inter prediction signal is generated based on a reconstructed image block of a reference picture (using pixel interpolation if necessary).

Referring next to FIG. 15, the configuration and operation of a general video coding device that inputs each CU of each frame of digitized video as an input image and outputs a bitstream will be described.

A video coding device 100A depicted in FIG. 15 includes a frequency transformer 101, a quantizer 102, an entropy encoder 103, an inverse frequency transformer/inverse quantizer 104, a buffer 105, an intra predictor 1060, an inter predictor 107, and a switch 110.

The intra predictor 1060 and the inter predictor 107 each generate a prediction signal for the input image signal of the CU. The intra predictor 1060 generates the prediction signal based on intra prediction. The inter predictor 107 generates the prediction signal based on inter prediction.

A prediction image supplied from the intra predictor 1060 or the inter predictor 107 via the switch 110 is subtracted from an image input to the video coding device 100A so that the input image becomes a prediction error image, and then the prediction error image is supplied to the frequency transformer 101.

The frequency transformer 101 frequency-transforms the prediction error image obtained by subtracting the prediction signal from the input image signal.

The quantizer 102 quantizes the frequency-transformed prediction error image (coefficient image). The entropy encoder 103 entropy-codes prediction parameters and the coefficient image, and outputs a bitstream.

The inverse frequency transformer/inverse quantizer 104 inverse-quantizes the coefficient image. The inverse frequency transformer/inverse quantizer 104 further inverse-frequency-transforms the inverse-quantized coefficient image. The prediction signal is added to the reconstructed prediction error image obtained by the inverse frequency transform, and the result is supplied to the buffer 105. The buffer 105 stores the reconstructed image.

The bitstream output from the video coding device is transmitted to a video decoding device. The video decoding device performs a decoding process to reconstruct the video image. FIG. 16 is a block diagram depicting an example of the structure of a general video decoding device that decodes the bitstream output from the general video coding device to obtain decoded video. The following describes the structure and operation of the general video decoding device with reference to FIG. 16.

A video decoding device 200A depicted in FIG. 16 includes an entropy decoder 203, an inverse frequency transformer/inverse quantizer 204, a buffer 205, an intra predictor 2060, an inter predictor 207, and a switch 210.

The entropy decoder 203 entropy-decodes the input bitstream. The entropy decoder 203 supplies the quantized coefficient image to the inverse frequency transformer/inverse quantizer 204, and the prediction parameters to the switch 210.

The inverse frequency transformer/inverse quantizer 204 inverse-quantizes the input quantized coefficient image, and outputs the result as the coefficient image. The inverse frequency transformer/inverse quantizer 204 further converts the coefficient image from the frequency domain to the spatial domain, and outputs the result as the prediction error image. The prediction error image is added to the prediction image supplied from the switch 210 to be a decoded image. The decoded image is output from the video decoding device 200A as an output image, and also supplied to the buffer 205 and the intra predictor 2060.

The buffer 205 stores previously decoded images as reference images. The intra predictor 2060 predicts the decoded image based on a reconstructed image previously decoded at the same position. The intra predictor 2060 thus generates the prediction image. The inter predictor 207 generates the prediction image based on a reference image supplied from the buffer 205.

The following describes the luma component (luminance signal: luma signal) and color difference component (color difference signal: chroma signal) of an image.

Each CTU is made up of a coding tree block (CTB) of a luma component and CTBs of chroma components corresponding to the luma component. In High Efficiency Video Coding (HEVC), 4:2:0, 4:2:2, and 4:4:4 depicted in FIG. 17 are each specified as the resolution of the luma component and chroma components. In FIG. 17, N denotes the number of pixels. As depicted in FIG. 17, in 4:2:0, the number of pixels of each of the U component and V component of the chroma signal is ½ of the number of pixels of the luma component Y in the horizontal direction and the vertical direction. In 4:2:2, the number of pixels of each of the U component and V component of the chroma signal is ½ of the number of pixels of the luma component Y in the horizontal direction. In 4:4:4, the number of pixels of each of the U component and V component of the chroma signal is the same as the number of pixels of the luma component Y in the horizontal direction and the vertical direction. In High Efficiency Video Coding (HEVC), the prediction mode (prediction direction) of intra prediction for the U component and the prediction mode of intra prediction for the V component are the same.

In HEVC, the video coding device can signal whether or not the prediction mode of the chroma components is the same as the prediction mode of the top left luma PU in the CU. Thus, the video coding device can prediction-code the chroma components based on the intra prediction mode of the luma component. The video coding device may apply a predetermined prediction mode to the luma component, in the case where the prediction mode of the luma component and the prediction mode of the chroma components are not the same.

CITATION LIST

Non Patent Literature(s)

NPL 1: Joint Collaborative Team on Video Coding (JCT-VC) of ITU-T SG16 WP3 and ISO/IEC JTC1/SC29/WG11 9th Meeting: Geneva, CH, 27 Apr.-7 May 2012

NPL 2: Jianle Chen, Vadim Seregin, Woo-Jin Han, Jungsun Kim, and Byeongmoon Jeon, "CE6.a.4: Chroma intra prediction by reconstructed luma samples", JCTVC-E266, Joint Collaborative Team on Video Coding (JCT-VC) of ITU-T SG16 WP3 and ISO/IEC JTC1/SC29/WG11 5th Meeting: Geneva, 16-23 Mar. 2011

SUMMARY OF INVENTION

Technical Problem

In HEVC, the prediction direction (gradient) of the U component and the prediction direction of the V component are the same, and so there is a problem in that intra prediction suitable for each of the U component and the V component cannot be performed. A prediction mode suitable for the U component is not necessarily suitable for the V component. This causes a problem of lower video signal coding efficiency. For example, in the case where the prediction mode is not suitable for the V component, the amount of code of the V component increases. The problem is more noticeable in the case of 4:2:2 or 4:4:4 where the number of pixels of each chroma component is larger.

The present invention has an object of providing a video coding device, video decoding device, video coding method, video decoding method, and program that can enhance the coding efficiency of chroma components.

Solution to Problem

A video coding device according to the present invention includes: intra prediction means for generating a predicted block, based on an adjacent reconstructed image; intra first chroma prediction mode coding means for encoding an intra prediction mode of a first chroma component based on an intra prediction mode of a luma component; and intra second chroma prediction mode coding means for encoding an intra prediction mode of a second chroma component depending on the intra prediction mode of the first chroma component.

A video decoding device according to the present invention includes: intra prediction means for generating a predicted block, based on an adjacent reconstructed image; intra first chroma prediction mode decoding means for decoding an intra prediction mode of a first chroma component based on an intra prediction mode of a luma component; and intra second chroma prediction mode decoding means for decoding an intra prediction mode of a second chroma component depending on the intra prediction mode of the first chroma component.

A video coding method according to the present invention is a video coding method used in a video coding device that includes intra prediction means for generating a predicted block based on an adjacent reconstructed image, and includes: encoding an intra prediction mode of a first chroma component based on an intra prediction mode of a luma component; and encoding an intra prediction mode of a second chroma component depending on the intra prediction mode of the chroma difference component.

A video decoding method according to the present invention is a video decoding method used in a video decoding device that includes intra prediction means for generating a predicted block based on an adjacent reconstructed image, and includes: decoding an intra prediction mode of a first chroma component based on an intra prediction mode of a luma component; and decoding an intra prediction mode of a second chroma component depending on the intra prediction mode of the first chroma component.

A video coding program according to the present invention causes a computer that includes intra prediction means for generating a predicted block based on an adjacent reconstructed image, to: encode an intra prediction mode of a first chroma component based on an intra prediction mode of a luma component; and encode an intra prediction mode of a second chroma component depending on the intra prediction mode of the first chroma component.

A video decoding program according to the present invention causes a computer that includes intra prediction means for generating a predicted block based on an adjacent reconstructed image, to: decode an intra prediction mode of a first chroma component based on an intra prediction mode of a luma component; and decode an intra prediction mode of a second chroma component depending on the intra prediction mode of the first chroma component.

Advantageous Effects of Invention

According to the present invention, it is possible to enhance the coding efficiency of chroma components.

BRIEF DESCRIPTION OF DRAWINGS

FIG. 5 It is an explanatory diagram depicting Sequence parameter set RBSP syntax.

FIG. 6 It is an explanatory diagram depicting Coding unit syntax.

FIG. 7 It is an explanatory diagram depicting Coding unit syntax.

FIG. 8 It is an explanatory diagram depicting a modification of the intra prediction modes of chroma components.

FIG. 9 It is a block diagram depicting the structure of a video decoding device in a second exemplary embodiment.

DESCRIPTION OF EMBODIMENTS

Exemplary Embodiment 1

Figure 1:
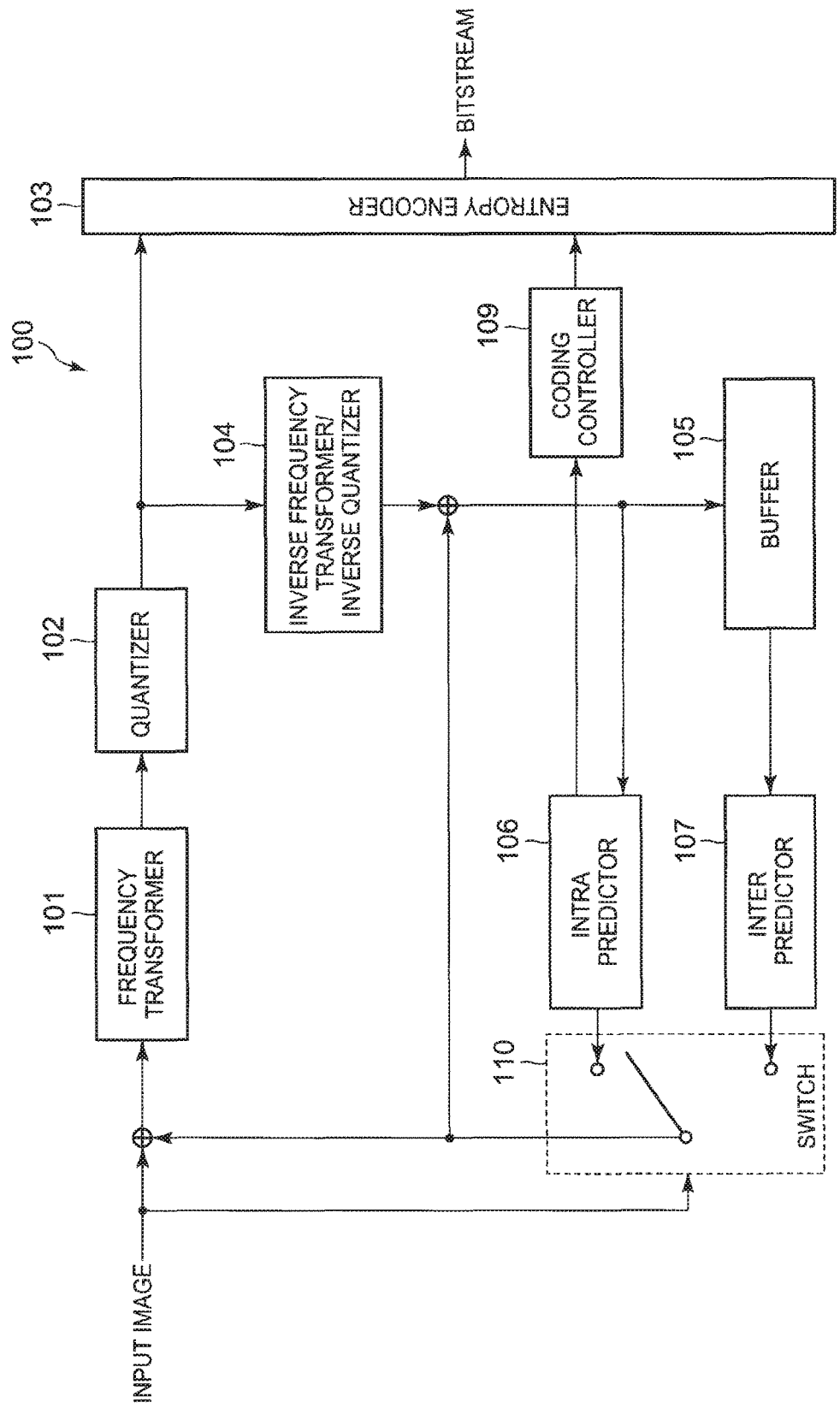
FIG. 1 It is a block diagram depicting a video coding device in a first exemplary embodiment.

FIG. 1 is a block diagram depicting a first exemplary embodiment of a video coding device 100. The following describes the structure of the video coding device 100 in the first exemplary embodiment that inputs each frame of digitized video as an input image and outputs a bitstream, with reference to FIG. 1.

Figure 15:
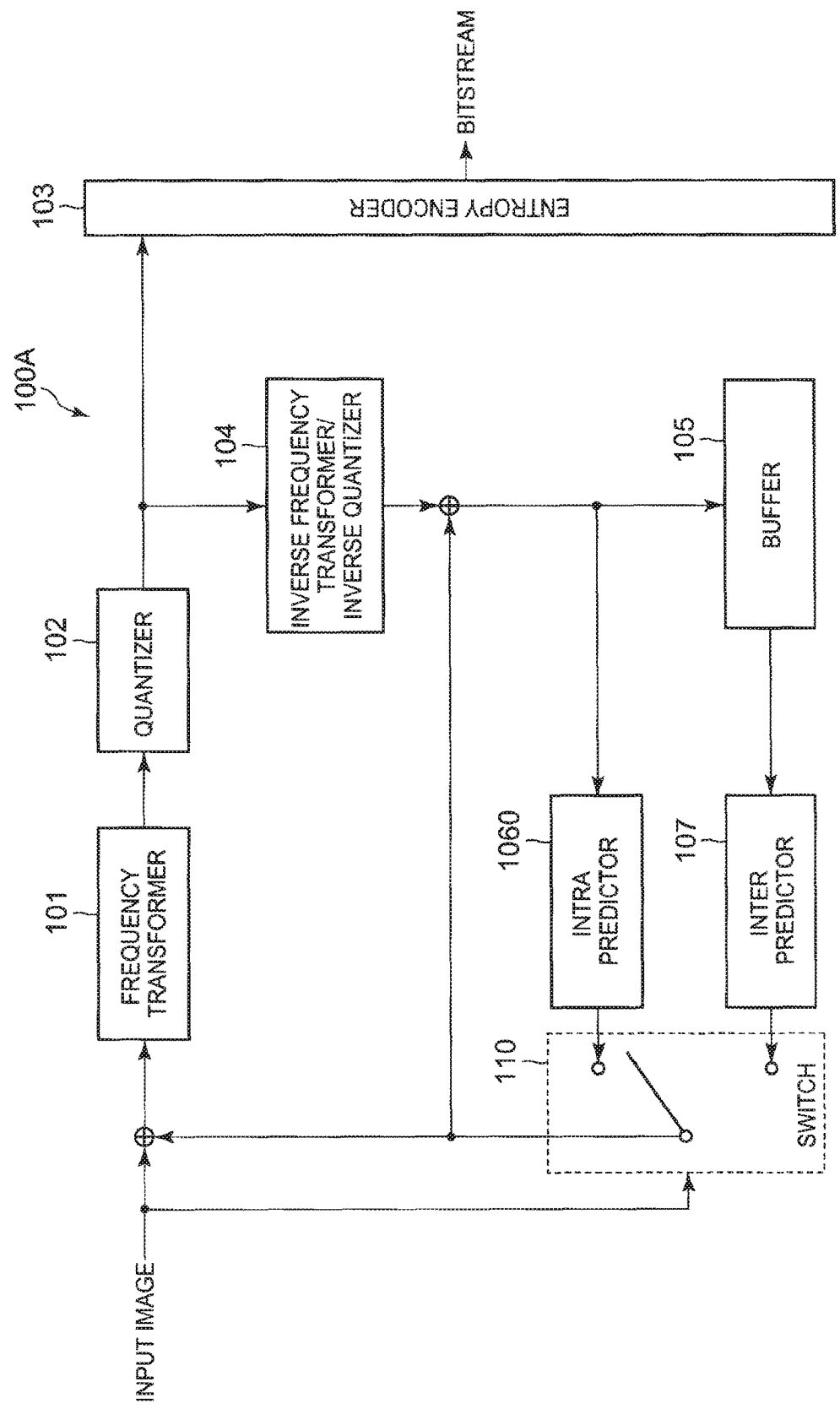
FIG. 15 It is a block diagram depicting the structure of a general video coding device.

As depicted in FIG. 1, the video coding device 100 in this exemplary embodiment includes a frequency transformer 101, a quantizer 102, an entropy encoder 103, an inverse frequency transformer/inverse quantizer 104, a buffer 105, an intra predictor 106, an inter predictor 107, and a switch 110, like the general video coding device 100A depicted in FIG. 15. The video coding device 100 further includes a coding controller 109. The intra predictor 106 has not only the function of the intra predictor 1060 depicted in FIG. 15, but also a function of performing intra prediction of a V component in a prediction mode different from a prediction mode of a U component.

The frequency transformer 101, the quantizer 102, the entropy encoder 103, the inverse frequency transformer/inverse quantizer 104, the buffer 105, the inter predictor 107, and the switch 110 are the same as those depicted in FIG. 15, and so the following mainly describes the operations of the intra predictor 106 and the coding controller 109.

Figure 2:
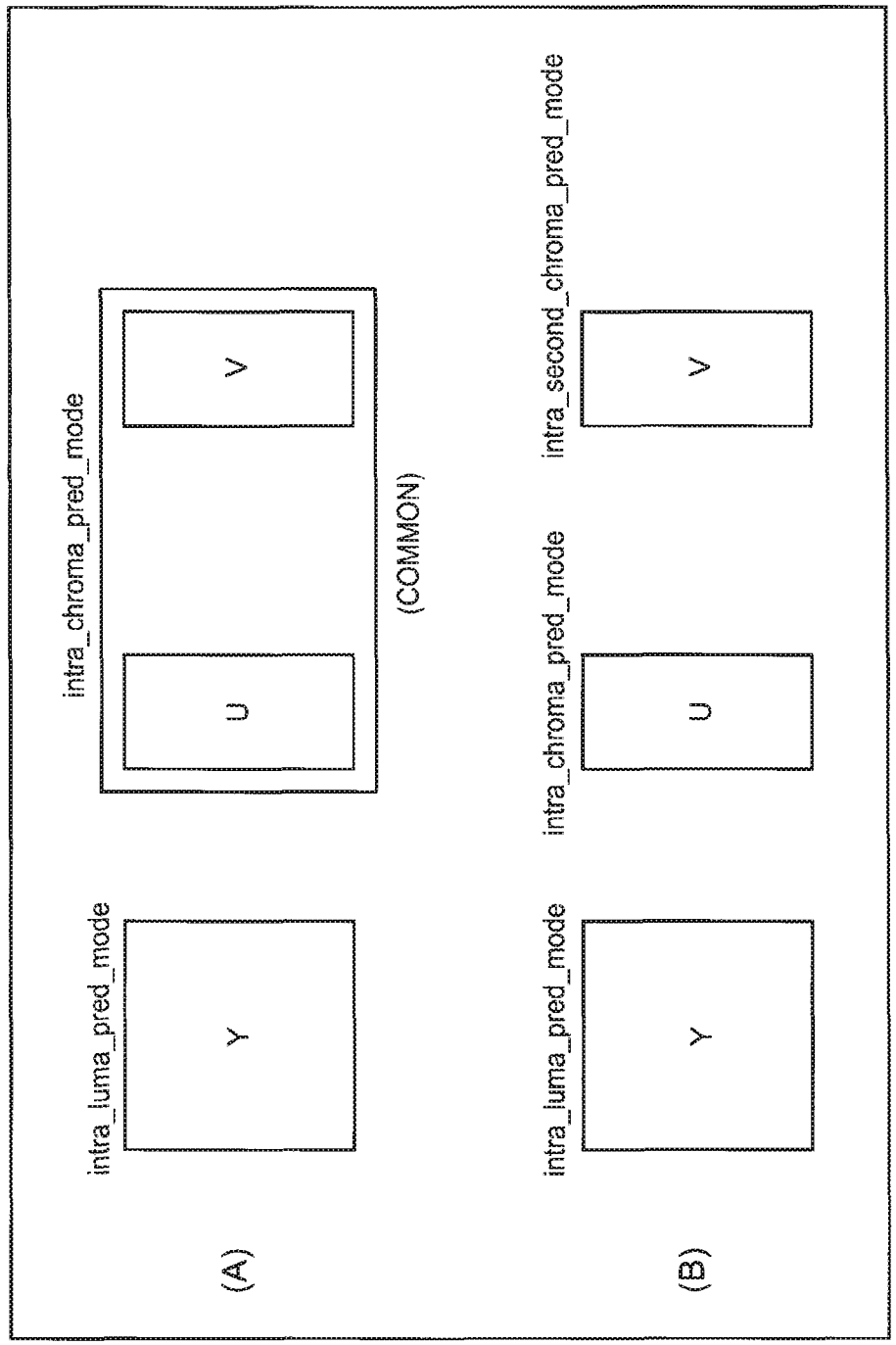
FIG. 2 It is an explanatory diagram depicting prediction modes of chroma components.

FIG. 2 is an explanatory diagram depicting prediction modes of chroma components. In FIG. 2, (A) depicts the prediction modes applied to chroma components in the video coding device based on the background art depicted in FIG. 15, and (B) depicts the prediction modes applied to chroma components in this exemplary embodiment.

In the video coding device based on the background art, the prediction mode of the V component is the same as the prediction mode of the U component, as depicted in (A) in FIG. 2. In FIG. 2, intra_luma_pred_mode denotes the prediction mode of the luma component, and intra_chroma_pred_mode and intra_second_chroma_pred_mode denote the prediction modes of the chroma components. In this exemplary embodiment, the prediction mode of the V component is specified separately from the prediction mode of the U component, as depicted in (B) in FIG. 2.

Figures 3, 4:
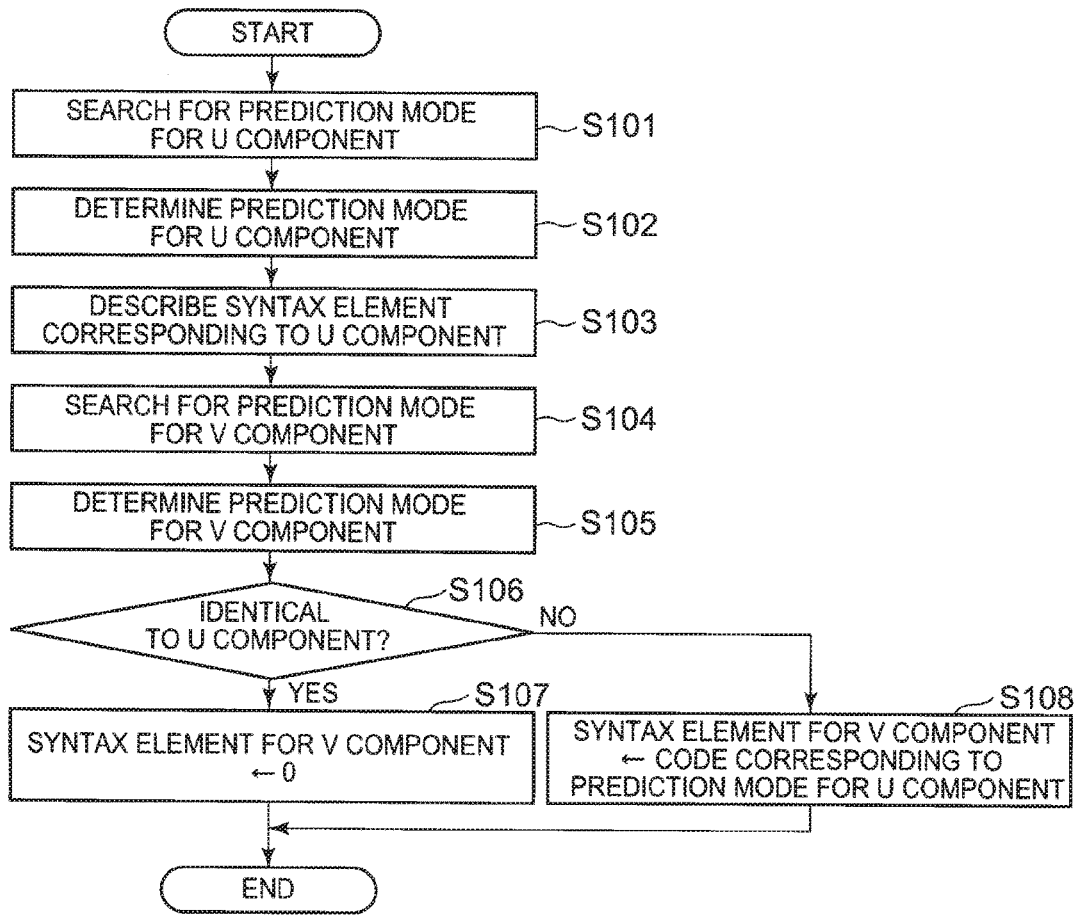
FIG. 3 It is an explanatory diagram depicting intra prediction modes of chroma components.
FIG. 4 It is a flowchart depicting the operation of the video coding device.

FIG. 3 is an explanatory diagram of intra prediction modes of chroma components in the video coding device in this exemplary embodiment. Hereafter, the prediction mode of the U component is also referred to as a intra first chroma prediction mode, and the prediction mode of the V component as a intra second chroma prediction mode. Alternatively, the prediction mode of the V component may be associated with a intra first chroma prediction mode, and the prediction mode of the U component with a intra second chroma prediction mode, as long as the prediction mode of the V component is specified independently of the prediction mode of the U component.

In this exemplary embodiment, 1-bit code 0 is assigned to the syntax of the intra second chroma prediction mode that is the same as the intra first chroma prediction mode, in consideration of the tendency that the probability of the intra prediction mode suitable for the U component and the intra prediction mode suitable for the V component being the same is high.

On the other hand, a 3-bit code is assigned to the intra second chroma prediction mode that is not the same as the intra first chroma prediction mode. Since the intra prediction modes of 0 (DC), 26 (vertical), 10 (horizontal), 1 (planar), and 34 (45° diagonally right) tend to be distributed uniformly, 3-bit codes are assigned to them. These intra prediction modes are prediction modes each having a relatively high possibility of occurrence. In FIG. 3, x denotes other than 0, 26, 10, and 1. The prediction mode of 34 is a prediction mode having a relatively high possibility of occurrence (for example, higher than prediction modes other than 0, 26, 10, and 1).

In detail, any of the 3-bit codes 100, 101, 110, and 111 is assigned to the syntax (=34) of the intra second chroma prediction mode in the 45° diagonally right direction, depending on the syntaxes of the intra first chroma prediction modes 0, 26, 10, and 1. Any of the 3-bit codes 100, 101, 110, and 111 is assigned to each of the syntaxes of the other intra second chroma prediction modes 0, 26, 10, and 1.

Although FIG. 3 depicts an example where 5 (=$2^2$+1) intra prediction modes, i.e. 0 (DC), 26 (vertical), 10 (horizontal), 1 (planar), and 34 (45° diagonally right), are each used as the intra second chroma prediction mode that is not the same as the intra first chroma prediction mode, any N (=$2^M$+1) (N is a natural number not less than 2) intra prediction modes may each be used as the intra second chroma prediction mode that is not the same as the intra first chroma prediction mode.

In detail, N intra prediction modes each having a high occurrence frequency are selected, and a (M+1)-bit (M is the number of bits that can express N in binary) code of a fixed amount is assigned to each of the N intra prediction modes. In more detail, any of the (M+1)-bit code words is assigned to the syntax of one (N−$2^M$) intra second chroma prediction mode of the selected N intra prediction modes, depending on the syntaxes of the intra first chroma prediction modes that are the same as the $2^M$ intra prediction modes of the selected N intra prediction modes. Moreover, any of the (M+1)-bit code words is assigned to each of the syntaxes of the $2^M$ intra second chroma prediction modes of the selected N intra prediction modes.

The following describes the processes for chroma components by the intra predictor 106 and the coding controller 109, with reference to a flowchart in FIG. 4.

The intra predictor 106 calculates the prediction pixels of the U component, for each prediction mode (step S101). In other words, the intra predictor 106 searches for a prediction mode. The intra predictor 106 thus determines the prediction mode of the U component that minimizes the cost (step S102). In the case where the prediction mode of the luma component and the prediction mode of the U component are not the same, the coding controller 109 describes a syntax element relating to the determined prediction mode of the U component (step S103).

Next, the intra predictor 106 calculates the prediction pixels of the V component, for each prediction mode (step S104). In other words, the intra predictor 106 searches for a prediction mode. The intra predictor 106 thus determines the prediction mode of the V component that minimizes the cost (step S105). The coding controller 109 determines whether or not the prediction mode of the V component is the same as the prediction mode of the U component (step S106). In the case where the prediction mode of the V component is the same as the prediction mode of the U component, the coding controller 109 assigns code 0 to the syntax element of the V component (step S107).

In the case where the prediction mode of the V component is not the same as the prediction mode of the U component, the coding controller 109 assigns the code corresponding to the prediction mode of the U component (or the code by which the prediction mode of the V component is identifiable), to the syntax element of the V component determined in the process of step S105 (step S108, see FIG. 3).

The entropy encoder 103 entropy-codes prediction parameters including prediction mode-related syntaxes.

FIG. 5 is an explanatory diagram depicting an example of Sequence parameter set RBSP syntax output from the entropy encoder 103.

In Sequence parameter set RBSP syntax depicted in FIG. 5, intra_second_chroma_pred_mode_enable_flag is set to 0 or 1.

Coding unit syntax is signaled as depicted in FIGS. 6 and 7. In the case where intra_second_chroma_pred_mode_enable_flag in Sequence parameter set RBSP syntax is set to 1, intra_second_chroma_pred_mode in Coding unit syntax is set to a code as depicted in FIG. 3 as an example.

NPL 2 discloses a new technique of chroma signal prediction (hereafter referred to as intra_chromaFromLuma prediction or linear prediction mode) utilizing the cross-correlation between the luma component (luma signal: luminance signal) and chroma component (chroma signal: color difference signal) of the same unit of coding. Specific operation steps of intra_chromaFromLuma are described in the section 8.3.3.1.8 Specification of Intra_FromLuma prediction mode in NPL 2. An overview is given below.

(Step 1) A down-sampled luma signal $p_Y'$ [x, y] (x=−1 . . . nS−1, y=−1 . . . nS−1) obtained by vertically ½ down-sampling a reconstructed luma signal predSamples[x, y] per horizontal 2 pixels is calculated using Formula (1) below.

$$p_Y'[x, y] = (recSamplesL[2x, 2y] + recSamplesL[2x, 2y+1]) \gg 1 \qquad \text{Formula (1)}$$

where nS is the width of a chroma signal (chroma block signal) (that is, the width of the reconstructed luma signal (chroma block signal) required for the process is 2+2*nS).

(Step 2) The sum L of down-sampled luma signals of the block boundary, the sum C of chroma signals of the block boundary, the square sum S of down-sampled luma signals of the block boundary, and the sum X of values obtained by multiplying the down-sampled luma signals of the block boundary and the chroma signals of the block boundary are calculated based on $p_Y'$[x, y] (x, y=−1 . . . nS−1) and the reconstructed chroma signal p[x, y] (x=−1, y=0, . . . nS−1, and x=0, . . . nS−1, y=−1).

(Step 3) Linear prediction coefficients a and b for linearly predicting the chroma signal (y) of the block boundary from the down-sampled luma signal ($p_Y'$) of the block boundary are calculated based on L, C, S, and X. Such linear prediction coefficients a and b that minimize the square sum $\Sigma(y-a*p_Y'-b)^2$ of prediction errors of linear prediction are calculated.

(Step 4) Based on the calculated a and b, the chroma prediction signal predSamples[x, y] (x, y=−1 . . . nS−1) in the block is calculated from the down-sampled luma signal $p_Y'$ [x, y] in the block using Formula (2) below.

$$predSamples[x, y] = a*p_Y'[x, y] + b \qquad \text{Formula (2).}$$

When the intra predictor 106 uses the linear prediction mode as the prediction mode of the chroma signal, the prediction of the U component and the prediction of the V component in the block to be predicted are optimized independently of each other. This is because the U component and the V component are each linearly predicted from the luma component based on the weight coefficient a and offset coefficient b optimized independently for each of the U component and the V component.

In the case where the linear prediction mode is included in the intra prediction modes used by the intra predictor 106, for example, chroma_pred_from_luma_enabled_flag in Sequence parameter set RBSP syntax is set to 1 indicating that the linear prediction mode is enabled. In the case where the intra_chroma_pred_mode of the U component in a block to be predicted is the linear prediction mode, the coding controller 109 suppresses the signaling of the intra_second_chroma_pred_mode of the V component in the Coding unit syntax of the block to be predicted. Thus, in the case where the linear prediction mode is also used as a prediction mode, the entropy encoder 103 does not perform encoding relating to the prediction mode of the V component.

As described above, in this exemplary embodiment, the video coding device 100 can encode the intra prediction mode of the U component based on the intra prediction mode of the Y component, encode the intra chroma prediction mode of the V component based on the intra prediction mode of the U component, and transmit the coded data to a video decoding device. This reduces an increase in the amount of code of the V component.

Modification of Exemplary Embodiment 1

In the case where the linear prediction mode is included in the intra prediction modes used by the intra predictor 106, for example, chroma_pred_from_luma_enabled_flag in Sequence parameter set RBSP syntax is set to 1 indicating that the linear prediction mode is enabled. In the case where the intra_chroma_pred_mode of the U component in a block to be predicted is the linear prediction mode, the coding controller 109 may perform the following process, instead of suppressing the signaling of the intra_second_chroma_pred_ mode of the V component in the Coding unit syntax of the block to be predicted. In detail, the coding controller 109 may assign the linear prediction mode to any of the prediction modes to which the 3-bit codes are assigned, and signal it. This is depicted in an explanatory diagram in FIG. 8 as an example.

Exemplary Embodiment 2

A second exemplary embodiment is an exemplary embodiment of a video decoding device that decodes the bitstream generated by the video coding device in the first exemplary embodiment.

FIG. 9 is a block diagram depicting the structure of a video decoding device 200 in the second exemplary embodiment. As depicted in FIG. 9, the video decoding device 200 in this exemplary embodiment includes an entropy decoder 203, an inverse frequency transformer/inverse quantizer 204, a buffer 205, an intra predictor 206, an inter predictor 207, and a switch 210, like the general video decoding device 200A depicted in FIG. 16. The video decoding device 200 further includes a decoding controller 209. The intra predictor 206 has not only the function of the intra predictor 2060 depicted in FIG. 16, but also a function of performing intra prediction of a V component in a prediction mode different from a prediction mode of a U component.

Figure 16:
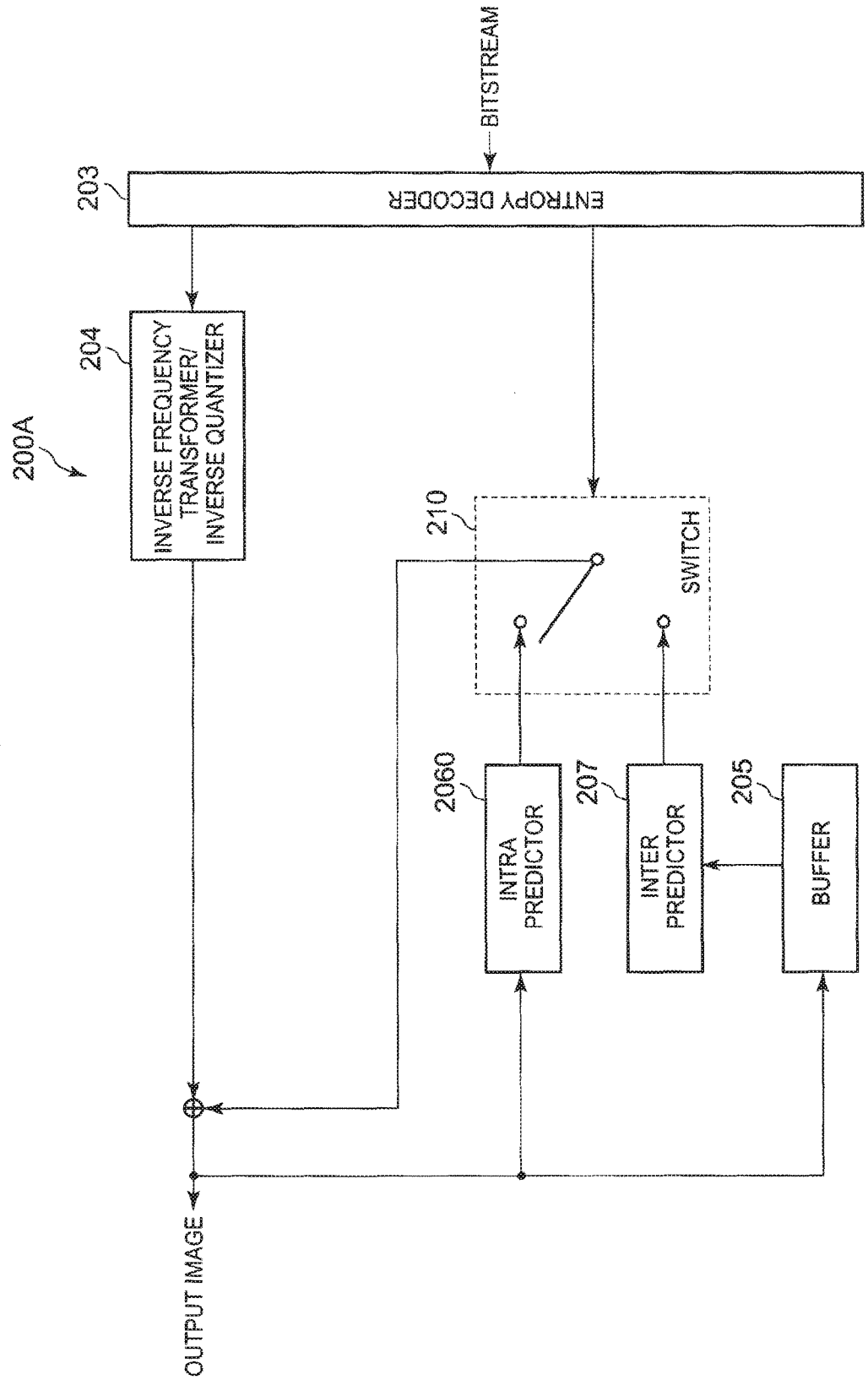
FIG. 16 It is a block diagram depicting the structure of a general video decoding device.
Figure 17:
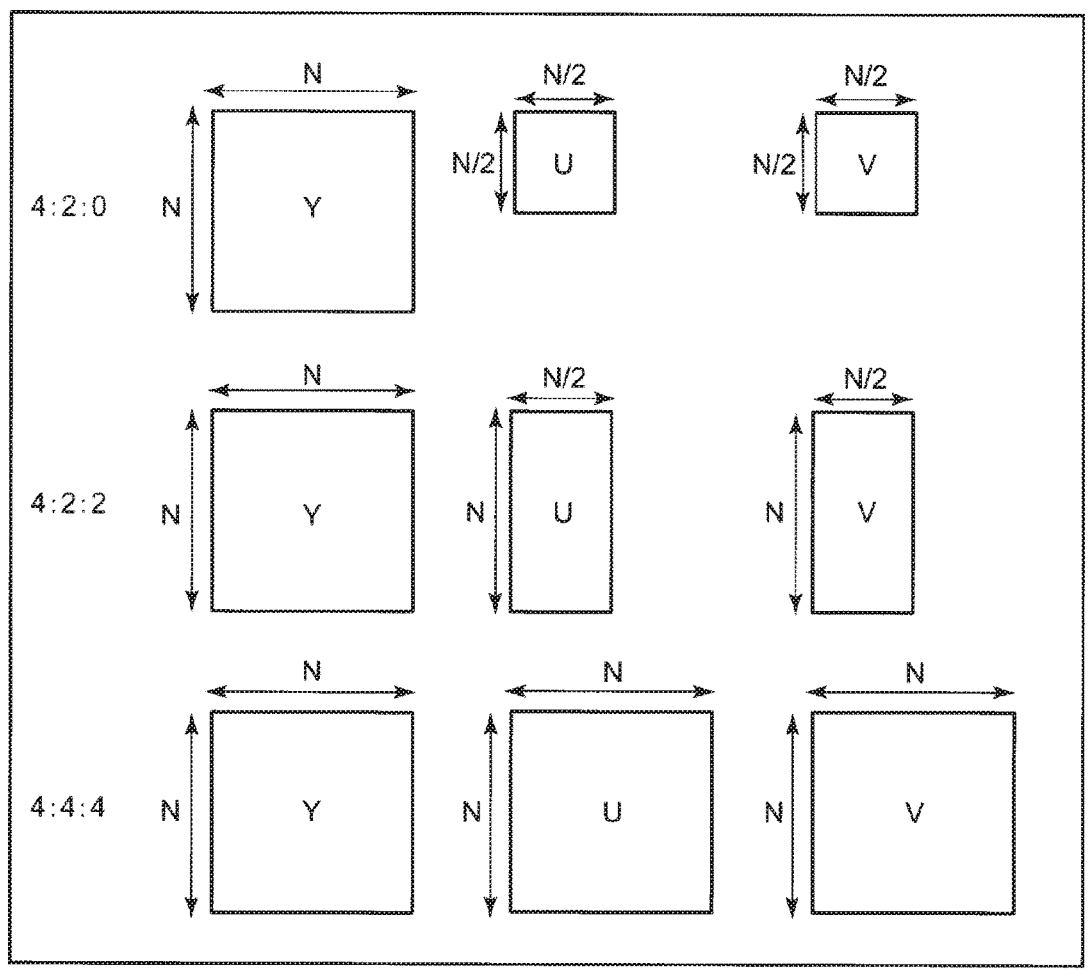
FIG. 17 It is an explanatory diagram depicting the resolutions of a luma component and chroma components.

The entropy decoder 203, the inverse frequency transformer/inverse quantizer 204, the buffer 205, the inter predictor 207, and the switch 210 are the same as those depicted in FIG. 16, and so the following mainly describes the operations of the intra predictor 206 and decoding controller 209.

Figure 10:
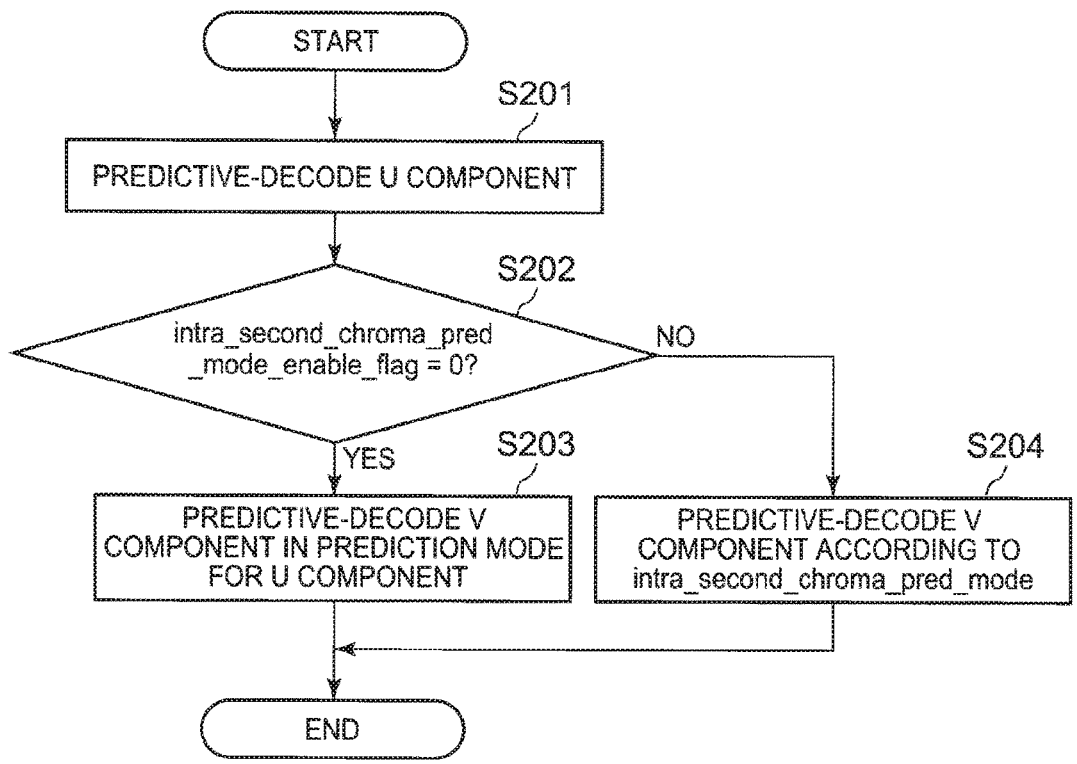
FIG. 10 It is a flowchart depicting the operation of the video decoding device.

The following describes the processes for chroma components by the intra predictor 206 and the decoding controller 209, with reference to a flowchart in FIG. 10.

In the case where the prediction mode of the luma component and the prediction mode of the chroma component are not the same, the intra predictor 206 predicts the U component of the chroma component based on the prediction mode of the U component included in the prediction parameters decoded by the entropy decoder 203 (step S201). In the case where the prediction mode of the luma component and the prediction mode of the chroma component are signaled to be the same, the intra predictor 206 uses the same prediction mode as the prediction mode of the luma component, as the prediction mode of the U component.

Next, the decoding controller 209 determines whether or not intra_second_chroma_pred_mode_enable_flag decoded by the entropy decoder 203 is 0 (step S202). In the case where intra_second_chroma_pred_mode_enable_flag is 0, the decoding controller 209 supplies, to the intra predictor 206, information indicating to prediction-decode the V component in the same prediction mode as the prediction mode of the U component. According to the information, the intra predictor 206 predicts the V component based on the same prediction mode as the prediction mode of the U component (step S203). In the case where intra_second_chroma_pred_mode_enable_flag is 1, the decoding controller 209 notifies the intra predictor 206 of the prediction mode identified by intra_second_chroma_pred_mode included in the prediction parameters decoded by the entropy decoder 203. The intra predictor 206 predicts the V component according to intra_second_chroma_pred_mode (step S204).

As mentioned earlier, the code corresponding to the prediction mode of the U component (for example, the code corresponding to the prediction mode of 34) or the code by which the prediction mode of the V component is identifiable (for example, the code corresponding to the prediction mode of 0, 1, 10, or 26) is written in intra_second_chroma_pred_mode.

In this exemplary embodiment, in the case where the linear prediction mode is used as the prediction mode of the U component, that is, in the case where chroma_pred_from_luma_enabled_flag in the signalled Sequence parameter set RBSP syntax is set to 1, the intra_second_chroma_pred_mode of the V component is not decoded in a block to be predicted in which the intra_chroma_pred_mode of the U component is the linear prediction mode. This is because intra_second_chroma_pred_mode is not transmitted from the video coding device in such a case. Thus, in the case where the intra prediction mode of the U component is the linear prediction mode, the entropy decoder 203 does not decode the intra prediction mode of the V component. In other words, in the case where the linear prediction mode is also used as a prediction mode, the entropy decoder 203 does not decode the intra prediction mode of the V component. In detail, in the case where chroma_pred_from_luma_enabled_flag in Sequence parameter set RBSP syntax is set to 1, the decoding controller 209 notifies the intra predictor 206 of the prediction mode identified by intra_second_chroma_pred_mode included in the prediction parameters decoded by the entropy decoder 203, in a block to be predicted in which the intra prediction mode of the U component is not the linear prediction mode. In a block to be predicted in which the intra prediction mode of the U component is the linear prediction mode, on the other hand, the use of the linear prediction mode to predict the V component is identified. The intra predictor 206 accordingly prediction-decodes the V component according to the specification of the linear prediction mode (for example, see NPL 2).

As described above, in this exemplary embodiment, the video decoding device 200 can prediction-decode the V component in the prediction mode suitable for the V component, based on the intra prediction mode of the U component. This reduces an increase in the amount of code.

Modification 1 of Exemplary Embodiment 2

In the case where the linear prediction mode is used as the prediction mode of the U component, that is, in the case where chroma_pred_from_luma_enabled_flag in the signaled Sequence parameter set RBSP syntax is set to 1, the entropy decoder 203 may execute the following process. In detail, the entropy decoder 203 decodes the prediction parameters including intra_second_chroma_pred_mode. The decoding controller 209 notifies the intra predictor 206 of the prediction mode identified by intra_second_chroma_pred_mode included in the prediction parameters decoded by the entropy decoder 203. This prediction mode identified by intra_second_chroma_pred_mode is the linear prediction mode. The intra predictor 206 prediction-decodes the V component according to the specification of the linear prediction mode (for example, see NPL 2), using the information of intra_second_chroma_pred_mode.

Each of the exemplary embodiments described above may be realized by hardware, but may also be realized by a computer program.

Figure 11:
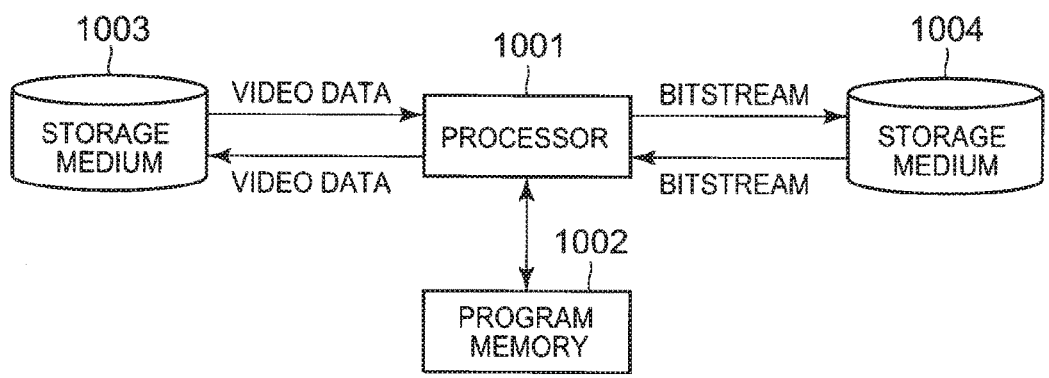
FIG. 11 It is a block diagram depicting an example of an information processing system using a program.

An information processing system depicted in FIG. 11 includes a processor 1001, a program memory 1002, a storage medium 1003 for storing video data, and a storage medium 1004 for storing a bitstream. The storage medium 1003 and the storage medium 1004 may be separate storage media, or storage areas included in the same storage medium. A magnetic storage medium such as a hard disk is available as such a storage medium.

In the information processing system depicted in FIG. 11, a program for realizing the functions of the blocks (except the block of the buffer) depicted in FIG. 1 or 9 is stored in the program memory 1002. The processor 1001 realizes the functions of the video coding device depicted in FIG. 1 or video decoding device depicted in FIG. 9, by executing the processes according to the program stored in the program memory 1002.

Figure 12:
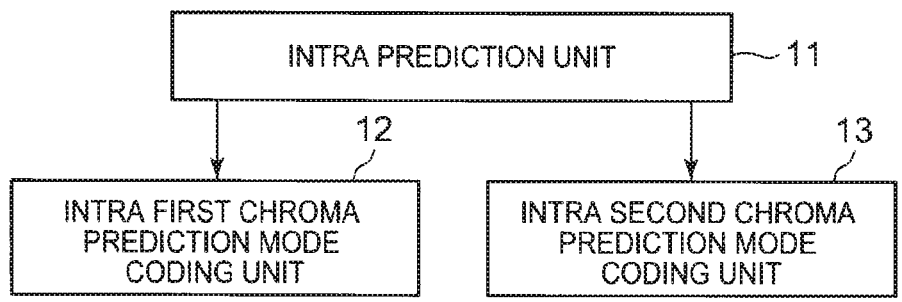
FIG. 12 It is a block diagram depicting main parts of a video coding device according to the present invention.

FIG. 12 is a block diagram depicting main parts of a video coding device according to the present invention. As depicted in FIG. 12, the video coding device according to the present invention includes: an intra prediction unit 11 (realized by the intra predictor 106 in the exemplary embodiment depicted in FIG. 1) for generating a predicted block, based on an adjacent reconstructed image; a intra first chroma prediction mode coding unit 12 (realized by the entropy encoder 103 and the coding controller 109 in the exemplary embodiment depicted in FIG. 1) for encoding a intra first chroma prediction mode coding unit which is an intra prediction mode of a first chroma component based on an intra prediction mode of a luma component; and a intra second chroma prediction mode coding unit 13 (realized by the entropy encoder 103 and the coding controller 109 in the exemplary embodiment depicted in FIG. 1) for encoding a intra second chroma prediction mode which is an intra prediction mode of a second chroma component based on the intra first chroma prediction mode.

Figure 13:
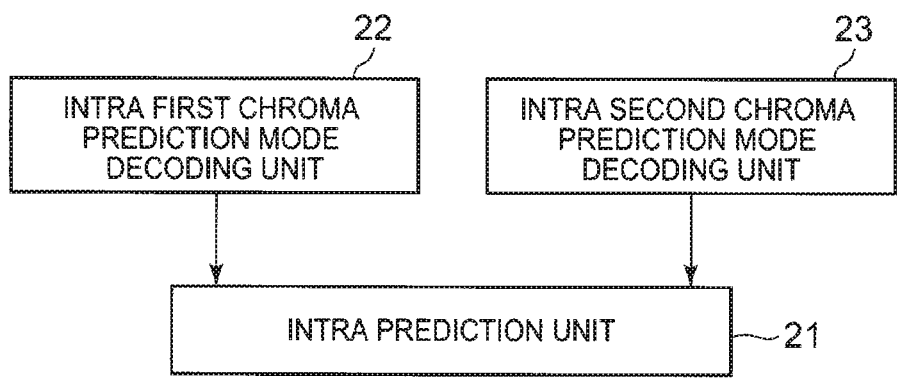
FIG. 13 It is a block diagram depicting main parts of a video decoding device according to the present invention.
Figure 14:
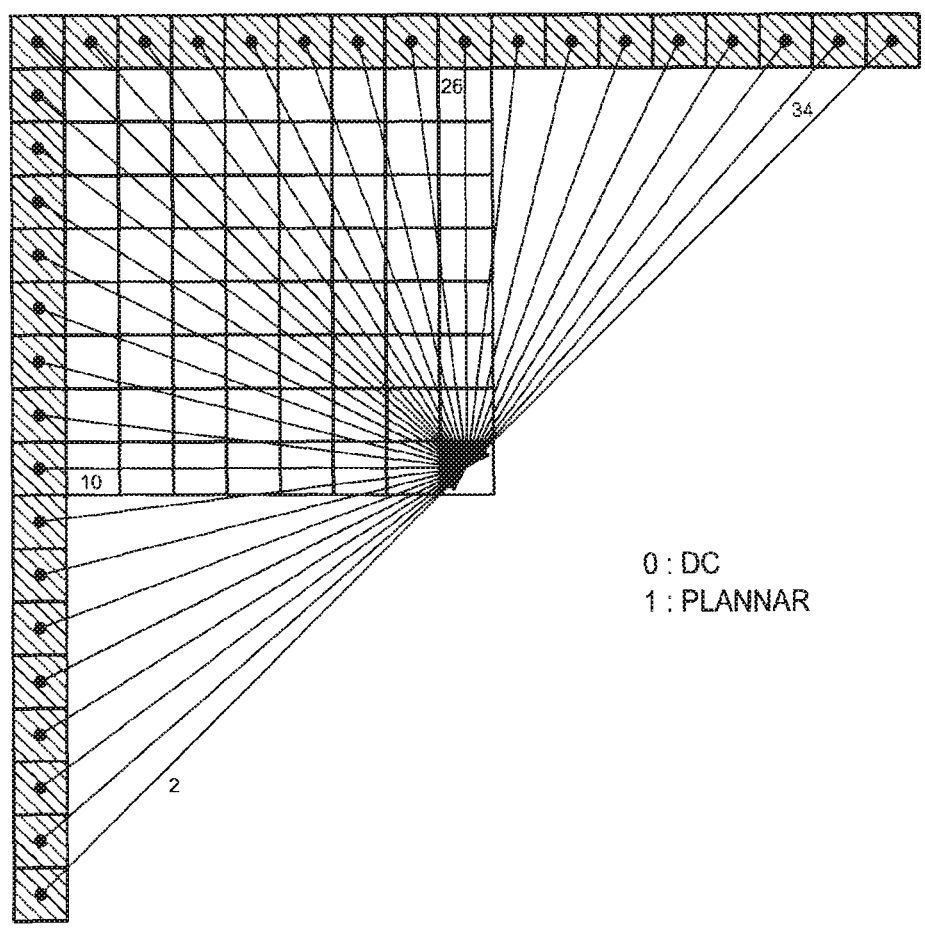
FIG. 14 It is an explanatory diagram depicting an example of 33 types of angular intra prediction.

FIG. 13 is a block diagram depicting main parts of a video decoding device according to the present invention. As depicted in FIG. 13, the video decoding device according to the present invention includes: an intra prediction unit 21 (realized by the intra predictor 206 in the exemplary embodiment depicted in FIG. 9) for generating a predicted block, based on an adjacent reconstructed image; a intra first chroma prediction mode decoding unit 22 (realized by the entropy decoder 203 and the decoding controller 209 in the exemplary embodiment depicted in FIG. 9) for decoding a intra first chroma prediction mode which is an intra prediction mode of a first chroma component based on an intra prediction mode of a luma component; and a intra second chroma prediction mode decoding unit 23 (realized by the entropy decoder 203 and the decoding controller 209 in the exemplary embodiment depicted in FIG. 9) for decoding a intra second chroma prediction mode which is an intra prediction mode of a second chroma component based on the intra first chroma prediction mode.

The foregoing exemplary embodiments may be partly or wholly described in the following supplementary notes, though the structure of the present invention is not limited to such.

(Supplementary note 1) A video coding device including: intra prediction means for generating a predicted block, based on an adjacent reconstructed image; and signaling means for signaling information for identifying whether or not an intra prediction mode of a first chroma component of chroma components and an intra prediction mode of a second chroma component of the chroma components are the same, and signaling, in the case where the intra prediction modes are different, information indicating the intra prediction mode of the second chroma component.

(Supplementary note 2) The video coding device according to supplementary note 1, wherein the signaling means describes a 1-bit signaling element, in the case where the intra prediction mode of the second chroma component is the same as the intra prediction mode of the first chroma component.

(Supplementary note 3) The video coding device according to supplementary note 2, wherein the signaling means signals information by which the intra prediction mode of the second chroma component is identifiable, in the case where the intra prediction mode of the second chroma component is different from the intra prediction mode of the first chroma component.

(Supplementary note 4) A video decoding device including: intra prediction means for generating a predicted block, based on an adjacent reconstructed image; and prediction mode information determination means for causing, in the case where information indicating that an intra prediction mode of a first chroma component of chroma components is the same as an intra prediction mode of a second chroma component of the chroma components is signaled, the intra prediction means to predict the second chroma component in the same prediction mode as the intra prediction mode of the first chroma component.

(Supplementary note 5) The video decoding device according to supplementary note 4, wherein the prediction mode information determination means causes the intra prediction means to predict the second chroma component based on signaled information by which the intra prediction mode of the second chroma component is identifiable, in the case where information indicating that the intra prediction mode of the second chroma component is different from the intra prediction mode of the first chroma component is signaled.

Although the present invention has been described with reference to the foregoing exemplary embodiments and examples, the present invention is not limited to the foregoing exemplary embodiments and examples. Various changes understandable by those skilled in the art can be made to the structures and details of the present invention within the scope of the present invention.

This application claims priority based on Japanese Patent Application No. 2013-150243 filed on Jul. 19, 2013, the disclosure of which is incorporated herein in its entirety.

REFERENCE SIGNS LIST 11 intra prediction unit
12 intra first chroma prediction mode coding unit
13 intra second chroma prediction mode coding unit
21 intra prediction unit
22 intra first chroma prediction mode decoding unit
23 intra second chroma prediction mode decoding unit
100 video coding device
101 frequency transformer
102 quantizer
103 entropy encoder
104 inverse frequency transformer/inverse quantizer
105 buffer
106 intra predictor
107 inter predictor
109 coding controller
110 switch
200 video decoding device
203 entropy decoder
204 inverse frequency transformer/inverse quantizer
205 buffer
206 intra predictor
207 inter predictor
209 decoding controller
210 switch
1001 processor
1002 program memory
1003 storage medium
1004 storage medium

The invention claimed is:
1. A video coding device comprising:
a memory storing a set of instructions; and
a processor configured to execute the instructions to:
generate a predicted block using intra prediction;
encode an intra prediction mode of a first chroma component based on an intra prediction mode of a luma component; and encode an intra prediction mode of a second chroma component depending on the intra prediction mode of the first chroma component.

2. The video coding device according to claim 1, wherein the intra prediction mode of the second chroma component is not coded, in the case where the intra prediction mode of the first chroma component is a linear prediction mode.

3. A video decoding device comprising:
   a memory storing a set of instructions; and
   a processor configured to execute the instructions to:
      predict an image based on a reconstructed image previously decoded;
      decode an intra prediction mode of a first chroma component based on an intra prediction mode of a luma component; and
      decode an intra prediction mode of a second chroma component depending on the intra prediction mode of the first chroma component.

4. The video decoding device according to claim 3, wherein the intra prediction mode of the second chroma component is not decoded, in the case where the intra prediction mode of the first chroma component is a linear prediction mode.

5. A video coding method used in a video coding device comprising a processor, the video coding method comprising:
   generating a predicted block using intra prediction;
   encoding an intra prediction mode of a first chroma component based on an intra prediction mode of a luma component; and
   encoding an intra prediction mode of a second chroma component depending on the intra prediction mode of the first chroma component.

6. The video coding method according to claim 5, wherein the intra prediction mode of the second chroma component is not coded in the case where the intra prediction mode of the first chroma component is a linear prediction mode.

7. A video decoding method used in a video decoding device comprising a processor, the video decoding method comprising:
   predicting an image based on a reconstructed image previously decoded;
   decoding an intra prediction mode of a first chroma component based on an intra prediction mode of a luma component; and
   decoding an intra prediction mode of a second chroma component depending on the intra prediction mode of the first chroma component.

8. The video decoding method according to claim 7, wherein the intra prediction mode of the second chroma component is not decoded in the case where the intra prediction mode of the first chroma component is a linear prediction mode.

9. A non-transitory computer readable information recording medium storing a video coding program which when executed, causes a video coding device to perform a method of video coding, the method comprising:
   encoding an intra prediction mode of a first chroma component based on an intra prediction mode of a luma component; and
   encoding an intra prediction mode of a second chroma component depending on the intra prediction mode of the first chroma component.

10. The non-transitory computer readable information recording medium according to claim 9, wherein the method of video coding further comprises:
   inhibiting the video coding device from encoding the intra prediction mode of the second chroma component in the case where the intra prediction mode of the first chroma component is a linear prediction mode.

11. A non-transitory computer readable information recording medium storing a video decoding program which, when executed, causes a video decoding device to perform a method for video decoding, the method comprising:
   decoding an intra prediction mode of a first chroma component based on an intra prediction mode of a luma component; and
   decoding an intra prediction mode of a second chroma component depending on the intra prediction mode of the first chroma component.

12. The non-transitory computer readable information recording medium according to claim 11, wherein the method of video decoding further comprises:
   inhibiting the video decoding device from decoding the intra prediction mode of the second chroma component in the case where the intra prediction mode of the first chroma component is a linear prediction mode.

* * * * *